(12) United States Patent
Elgressy (10) Patent No.: US 9,975,156 B2
(45) Date of Patent: May 22, 2018

(54) BREAKDOWN OF FUEL COMPONENTS AND SOLVENTS IN GROUNDWATER AND CONTAMINATED SOIL

(71) Applicant: Elie Elgressy, Netanya (IL)

(72) Inventor: Elie Elgressy, Netanya (IL)

( * ) Notice: Subject to any disclaimer, the term of this patent is extended or adjusted under 35 U.S.C. 154(b) by 0 days. days.

(21) Appl. No.: 15/559,053

(22) PCT Filed: Dec. 3, 2015

(86) PCT No.: PCT/IL2015/051175
§ 371 (c)(1),
(2) Date: Sep. 17, 2017

(87) PCT Pub. No.: WO2016/147168
PCT Pub. Date: Sep. 22, 2016

(65) Prior Publication Data
US 2018/0071800 A1 Mar. 15, 2018

Related U.S. Application Data

(60) Provisional application No. 62/135,247, filed on Mar. 19, 2015.

(51) Int. Cl.
*B09C 1/08* (2006.01)
*B09C 1/10* (2006.01)
(Continued)

(52) U.S. Cl.
CPC ............. *B09C 1/085* (2013.01); *B09C 1/10* (2013.01); *C02F 1/4672* (2013.01); *C02F 1/722* (2013.01);
(Continued)

(58) Field of Classification Search
CPC ....... B09C 1/085; B09C 1/10; B02C 2101/00; C02F 1/4672; C02F 1/722; C02F 3/005;
(Continued)

(56) References Cited

U.S. PATENT DOCUMENTS 5,037,240 A 8/1991 Sherman
5,861,090 A 1/1999 Clarke et al.
(Continued)

FOREIGN PATENT DOCUMENTS

GB 1399576 A1 7/1975
WO WO 2012/142435 A2 10/2012

OTHER PUBLICATIONS

Kraft, A., Doped Diamond: A Compact Review on a New, Versatile Electrode Material, Int. J. Electrochem. Sci., May 2, 2007, Issue 5, No. 2, pp. 355-385.
(Continued)

*Primary Examiner* — Benjamin F Fiorello
(74) *Attorney, Agent, or Firm* — Ted Whitlock (57) ABSTRACT

A system and method for remediation of polluted sites, implementing a combination of chemical and biological breakdown modes on the contaminating compounds. The system includes at least one reactor for production in situ of reagents required for the breakdown modes. The reactor includes at least three types of substantially independent electro-cells for production of Fenton reagents and dissolved oxygen. The method according to the invention includes utilizing at least one reactor which comprised of substantially independent electro-cells for producing reagents required for remediation of the polluted sites and a computerized controller loaded with data obtained from a site survey, measurements made by instruments and programmed sequence.

The existing remediation techniques encounter in serious difficulties due to poor process control. Using the system according to the present invention allows control of the parameters and acceleration of the remediation process.

9 Claims, 5 Drawing Sheets

(51) Int. Cl.
  *C02F 1/467* (2006.01)
  *C25B 1/30* (2006.01)
  *C25B 11/04* (2006.01)
  *C25B 9/18* (2006.01)
  *C02F 1/72* (2006.01)
  *C02F 3/00* (2006.01)
  *C02F 103/06* (2006.01)

(52) U.S. Cl.
  CPC ............... *C02F 3/005* (2013.01); *C25B 9/18* (2013.01); *C25B 11/0405* (2013.01); *C25B 11/0447* (2013.01); *B09C 2101/00* (2013.01); *C02F 2103/06* (2013.01); *C02F 2209/006* (2013.01); *C02F 2209/02* (2013.01); *C02F 2209/04* (2013.01); *C02F 2209/06* (2013.01); *C02F 2305/026* (2013.01)

(58) Field of Classification Search
  CPC ............ C02F 2103/06; C02F 2209/006; C02F 2209/02; C02F 2209/06; C02F 2205/026; C25B 9/15; C25B 11/0405; C25B 11/0447
  See application file for complete search history.

(56) References Cited

U.S. PATENT DOCUMENTS

| | | | |
|---|---|---|---|
| 8,557,110 B2* | 10/2013 | Kerfoot | B01F 3/04269 210/170.07 |
| 2003/0173082 A1* | 9/2003 | Vinegar | E21B 43/243 166/272.2 |
| 2005/0067356 A1* | 3/2005 | Bowman | B09C 1/002 405/128.5 |
| 2010/0209193 A1* | 8/2010 | Hoag | B09C 1/08 405/128.45 |
| 2015/0273546 A1* | 10/2015 | Robinson | C02F 1/685 210/747.8 |

OTHER PUBLICATIONS

International Search Report in PCT/IL2015/051175 (Pub No. WO 2016/147168).
Written Opinion in PCT/IL2015/051175 (Pub No. WO 2016/147168).
International Preliminary Report on Patentability (IPRP) in PCT/IL2015/051175 (Pub No. WO 2016/147168).

* cited by examiner

BREAKDOWN OF FUEL COMPONENTS AND SOLVENTS IN GROUNDWATER AND CONTAMINATED SOIL

CROSS-REFERENCE TO RELATED APPLICATIONS

This application is a 371 filing from PCT/IL/051175, filed 3 Dec. 2015, which claims the benefit of U.S. Provisional Patent Application, Ser. No. 62/135,247, filed Mar. 19, 2015.

BACKGROUND

Field of the Invention

The present invention is a system and a protocol for use for biochemical remediation of polluted sites. The system referred to hereinafter as EBR (electro bio remediation system), implements a method for enhancing biological breakdown of contaminants.

Description of the Related Art

Aromatic compounds constitute a major contribution to pollutions caused by leaking fuel storage tanks. The U.S. environmental protection agency (EPA) has recorded hundreds such leakages in the U.S. An additional portion of pollutants that may be found in similarly polluted sites are halocarbons such as commonly used as industrial solvents, and gasoline additives.

More specifically, some of the common chemical compounds that are usually found in such polluted sites are: BTEX (benzene, toluene, ethyl benzene and xylene), TCE (Trichloroethylene), PCE (Perchloroethene) DCE (1,2-dichloroethane) and MTBE (Methyl tert-butyl ether).

As a result of rather high solubility in water, some of the pollutants mentioned above may spread to great distances. The maximum permissible concentrations for hydrocarbon compounds found in groundwater may be in the order of a few micrograms per liter.

When sufficient oxygen is available to microorganisms, they are able to consume the carbon found in the contaminating compounds. Microbial breakdown of hydrocarbons and other pollutants is carried out in a sequence of reactions including for example cellular respiration under aerobic conditions, denitrification, manganese reduction, iron reduction, sulfate reduction, and methanogenesis. Biodegradation may proceed to completion providing there is a non limiting supply of electron acceptors.

Electro-bioremediation is a concept according to which electrical fields produced by electrodes installed in polluted sites cause a movement of charged particles such as chemical compounds and microorganisms toward attracting electrodes. The effectiveness of the electro-bioremediation may be limited mainly due to the relative water insolubility and the heterogeneity of the pollutant aggregates. Electro-bioremediation as well as other existing bioremediation technologies may be also limited due to incapability of the microorganisms in the breaking down of less bio-available contaminating compounds. Increasing the bioavailability of chemical compounds is referred to sometimes as "mobilization".

In situ chemical oxidation (ISCO) is an approach by which different technologies may be used to deliver strong oxidizers into the contaminated medium. Fenton's reagents are the most widely used oxidants; usually they are delivered through perforated hollow metal rods hammered into the ground by "direct-push" drilling methods or by injection. The mobilization of hydrocarbons and other pollutants by using Fenton's reagents makes use of a series of chemical reactions in which iron ions catalyze the formation of hydroxyl radicals (.OH) from hydrogen peroxide as represented below:

1.

2.

3.

4.

5.

6.

7.

The hydroxyl radicals that are produced oxidize the contaminating compounds as shown in the below examples:

where "R" represent a hydrocarbon contaminant where "RCL" represent a chlorinated solvent contaminant Due to its rapid decomposition, long distance transport of hydrogen peroxide may be problematic. However, this phenomenon can become an ecological advantage when hydrogen peroxide is supplied in situ. The reason for that is that at the end of the remediation process, the site is expected to be devoid of hydrogen peroxide residues.

Although that the existing remediation techniques based on Fenton reagents were found useful, they still have serious deficiencies such as: post oxidation increases in soil gas contaminant concentrations; steam production; mass flux of volatiles from wells near the injection zone; heat released, asphalt upheaval, explosions, fire; overflowing wells; post-oxidation redistribution of contaminants.

SUMMARY OF EMBODIMENTS OF THE INVENTION

The present invention is an electro bio remediation system that comprises a reactor divided to fully independent electro-cells of which electrodes of various types are installed therein, such as: doped diamond coated titanium, $IrO_2$ and $Ta_2O_5$ coated titanium, iron and sampling electrodes.

The present invention allows an acceleration of bioremediation process of polluted sites compared with existing technologies.

The reactor in accordance with the present invention is to produce in situ the reagents required for the accelerated bio remediation.

Using the reactor allows control of the parameters governing the accelerated remediation process.

The present invention enhances the mobilization of the hydrocarbon and other pollutants and therefore increases their bioavailability and thus accelerating the bioremediation.

The present invention also increases the oxygen levels to support the proliferation of microorganisms' populations and the acceleration of the bioremediation.

BRIEF DESCRIPTION OF THE DRAWINGS

The present invention is herein described, by way of example only, with reference to the accompanying drawings, wherein.

DETAILED DESCRIPTION OF SOME EMBODIMENTS OF THE INVENTION

The present invention can be implemented in a different fashion that what the specification describes infra with regard to the illustration.

The implementation of the present invention allows for the breakdown of polluting fuel components and solvents found in polluted sites, by applying a protocol and an EBR system. In accordance with the present invention one reactor or more produce reagents required for the remediation of polluted sites by using a combination of a chemical and a biological breakdown of the polluting compounds. The EBR reactor produces the reagents in separately installed and substantially independent electro-cells. Three kinds of electro-cells function in the system of the invention as will be explained later. Of these cells two kinds produce Fenton reagents while the third kind produces dissolved oxygen. Examples of electrodes that may be installed in the electro-cells are: doped diamond coated titanium, $IrO_2$ and $Ta_2O_5$ coated titanium, and iron.

According to an embodiment of the present invention, a computerized controller regulates the operation of electro cells installed in a reactor, as defined in a predetermined sequence of stages and data inputs. This system facilitates a dynamic control over production of the reagents required for a combination of a chemical and biological breakdown of polluting compounds.

Figure 1A:
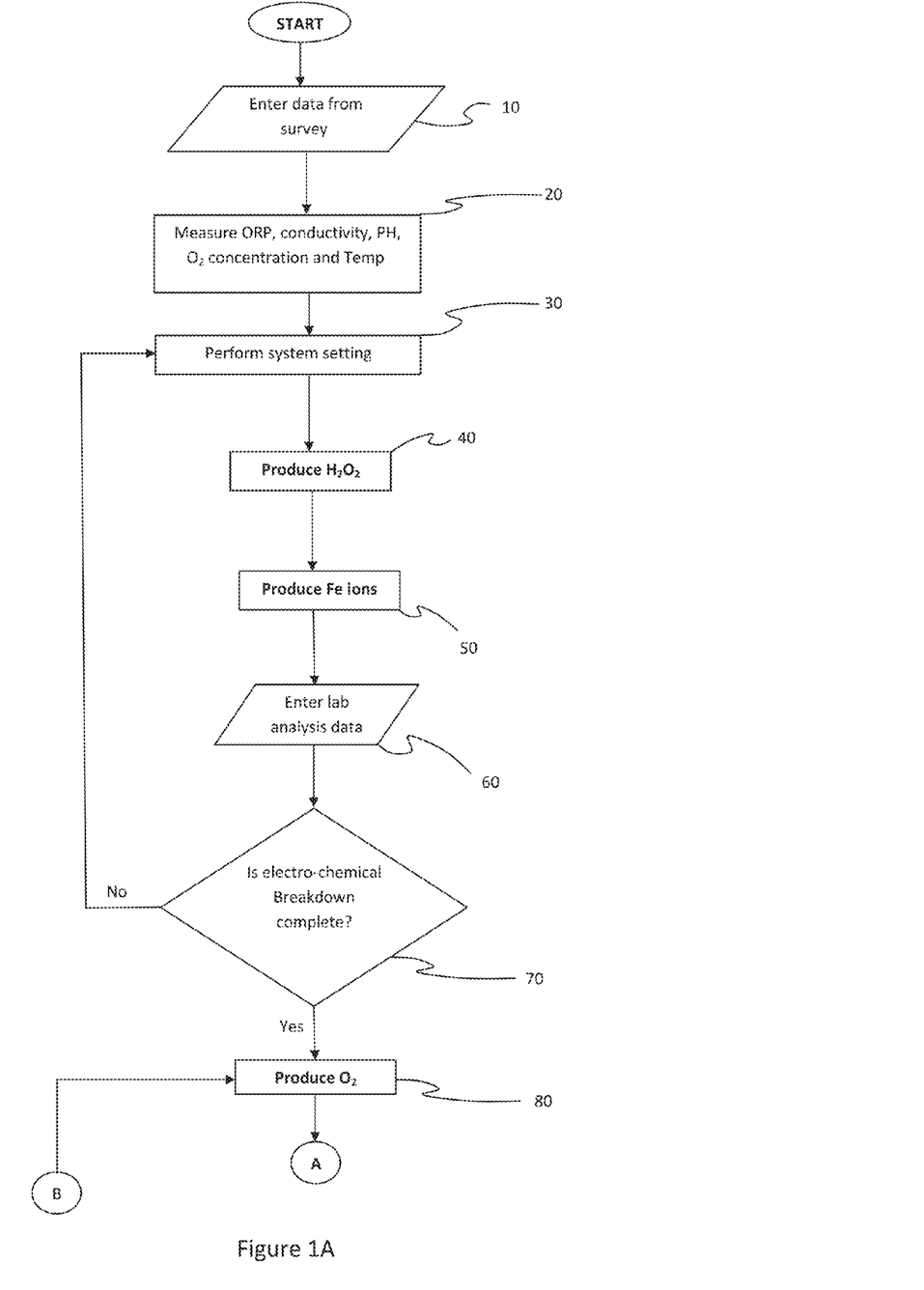
FIG. 1 is a schematic flowchart showing an electro bioremediation process according to an aspect of the present invention.
Figure 1B:
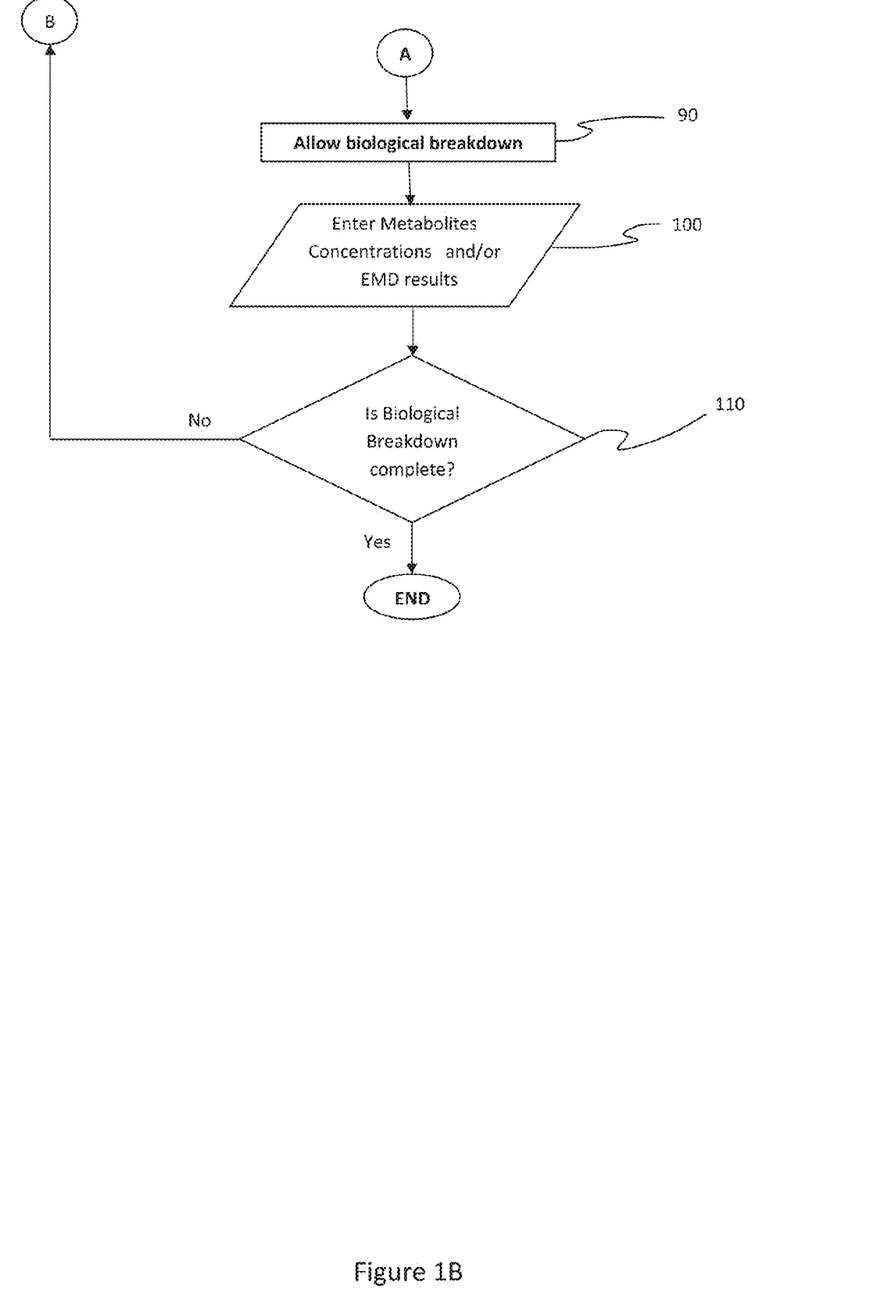

The flowchart in FIG. 1 demonstrates a, protocol for a remediation of a polluted according to an aspect of the present invention.

The protocol begins by performing a survey of the chemical compounds and microorganism populations existing at the site, special attention is drawn to metals, most importantly iron ions.

The data from the survey are fed to the computerized controller of the EBR, after its installation at site 10. At this stage the system begins collecting measurements of parameters such as oxidation-reduction potential (ORP), current density, conductivity, pH and temperatures 20.

Then, before the actual remediation begins, the EBR system setting stage is carried out utilizing data of: inputs from site survey and the preliminary measurements 30. Target values of parameters governing the production in the EBR reactor are determined in the system setting stage.

The remediation of a polluted site in accordance with the present invention includes two main phases, namely the electro chemical phase and the biological phase. The electro chemical phase includes a production stage in which oxygen, hydrogen peroxide and iron ions are produced. Parameters relevant for the control over the production of reagents are measured during the electro chemical phase. The parameters having particular importance are typically: oxygen concentration, ORP (oxidation-reduction potential), current density, conductivity, pH and temperatures.

In the first stage of the electro chemical phase, hydrogen peroxide 40 is produced by reaction of dissolved oxygen with water. This production continues until the measurements of dissolved oxygen, ORP, current density and pH reach to their target values as defined in the system setting.

In the next stage iron ions 50 are produced. This stage begins as dictated by the system settings. Measurements of ORP, pH, current density, conductivity and temperatures are most important at this stage. The production of iron ions continues until target values for ending the stage are reached as defined in the system setting.

The amount of iron ions produced may be calculated using the equations of Faraday's laws of electrolysis and the measurement of the current density.

As mentioned in the background section, the presence of the iron ions allows a catalysis of series of reactions of the formation of hydroxyl radicals (.OH) from the hydrogen peroxide.

Bioavailable shorter hydrocarbon compounds are typically the products of the oxidation reactions that take place between the hydroxyl radicals and polluting hydrocarbon compounds.

Before the production of oxygen required for the microorganisms in the bioremediation phase, the concentrations of bioavailable hydrocarbon compounds are measured in lab. The results of these measurements are fed to the EBR computerized controller 60 that verifies the completion of the electro chemical breakdown and that the production of oxygen can now begin 70. As long as the electrochemical breakdown is not completed, the EBR returns to the system setting stage, in order to determine new values for the production control parameters. Subsequently, the stages of production of the hydrogen peroxide and the iron ions are repeated and new lab tests are checked for verification that the electro chemical phase is completed.

After satisfying the conditions for the completion of the electro chemical breakdown, the production stage of oxygen begins and continues until the measurements of dissolved oxygen, ORP, current density and pH are as defined for completion of this stage, according to system setting 80. In accordance to another embodiment of the invention, parameters that determine the duration of the oxygen production stage are based on data regarding the oxygen consumption rate of the microorganisms as revealed in the preliminary survey of the site.

Resulting from the presence of hydrogen peroxide, the biological breakdown may be negligible during electrochemical phase. However, when the production of hydrogen peroxide terminates and its concentration decreases, the microorganisms population recovers. The production of oxygen by the EBR, promotes an acceleration of proliferation of the microorganisms, which promotes the biological breakdown 90.

The biodegradation of fuel hydrocarbons, especially of BTEXs is limited mainly by the availability electron acceptor, and may proceed until all of the contaminants which are accessible for the microorganisms are consumed. Yet, according to another embodiment of the invention, several techniques can be applied to assess quantitatively the activity of microorganisms. Those techniques include laboratory analysis of BTEXs, MTBE, TBA, sampling and measuring of concentrations of metabolites and/or environmental molecular diagnostics (EMD) techniques such as compound specific isotope analysis (CSIA) and/or stable isotope probing (SIP). Measurements indicating the activity of the microorganisms are fed to the EBR and are used for the determination of the completion of the biological breakdown 110. In case that it is found that the biological breakdown is not completed, oxygen production stage is resumed.

According to another embodiment of the invention, which is not shown in FIG. 1, before resumption of the oxygen production, new setting of target values for ending the oxygen production stage are inserted in order to enhance proliferation of more microorganism populations that are capable of breaking down bioavailable compounds.

Figure 2:
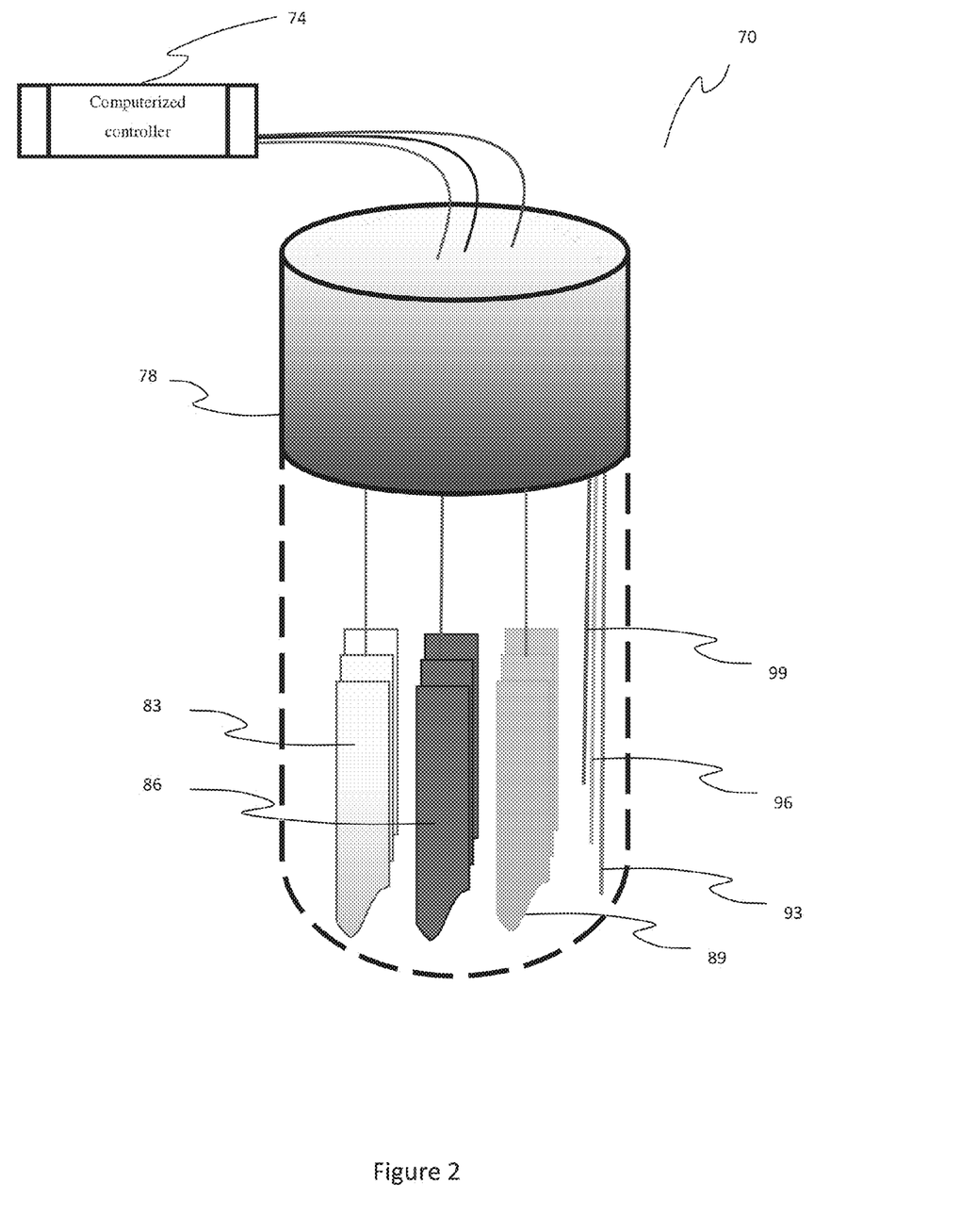
FIG. 2 is a schematic drawing showing the construction of a reactor according to an embodiment of the present invention of which three substantially independent electro-cells

FIG. 2 is a schematic drawing of an EBR reactor 70 according an embodiment of the present invention. The reactor consists of three electro cells that operate independently and are each controlled by a computerized controller 74. The three electro cells differ from each other in the type of electrodes which they employ: doped diamond coated titanium for hydrogen peroxide production 83, $IrO_2$ and $Ta_2O_5$ coated titanium for oxygen production 86, and iron 89. According to an embodiment of the present invention there are three sampling instruments installed in the EBR in addition to the above electrodes reactor for measurements of: temperature 93, pH 96 and oxygen concentration 99.

In accordance with yet another embodiment of the invention, not shown in FIG. 2, additional instruments for more measurements such as ORP, current density and conductivity are installed in the reactor.

Data of measurements are sent to the computerized controller for monitoring and for determining of the remediation status and compared to system settings. Additional data types used for the control of the bioremediation and the electro-cells by the computerized controller are: the stoichiometry of the Fenton reactions and the rate of consumption of oxygen of populations of microorganisms present in a polluted site as found in the preliminary site survey.

Conductivity and temperature measurements may be used for controlling the electrical current supplied to the electro cells in accordance to the system setting.

According to another a more preferred embodiment aspect of the invention; the EBR includes a feature for reversing the polarity of the electrodes that are installed in the electro-cells in order to clean sediments that may accumulate on the electrodes.

According to another more preferred embodiment of the invention, the alterations of the polarity of the electrodes, during the chemical breakdown phase are according to time intervals.

ORP values above 450 mv which are possible during hydrogen peroxide production stage are harmful for the microorganism populations. In order to keep the ORP values under 450 mv, during the biological breakdown, whenever the ORP measured value reach the threshold of 450 mv, the EBR controller alters the polarity of the electrodes and thus cause a reduction in the ORP measured values. According to another more preferred embodiment of the invention, the ORP values that are maintained during the biological breakdown are kept between 150 and 450 mvs.

Figure 3:
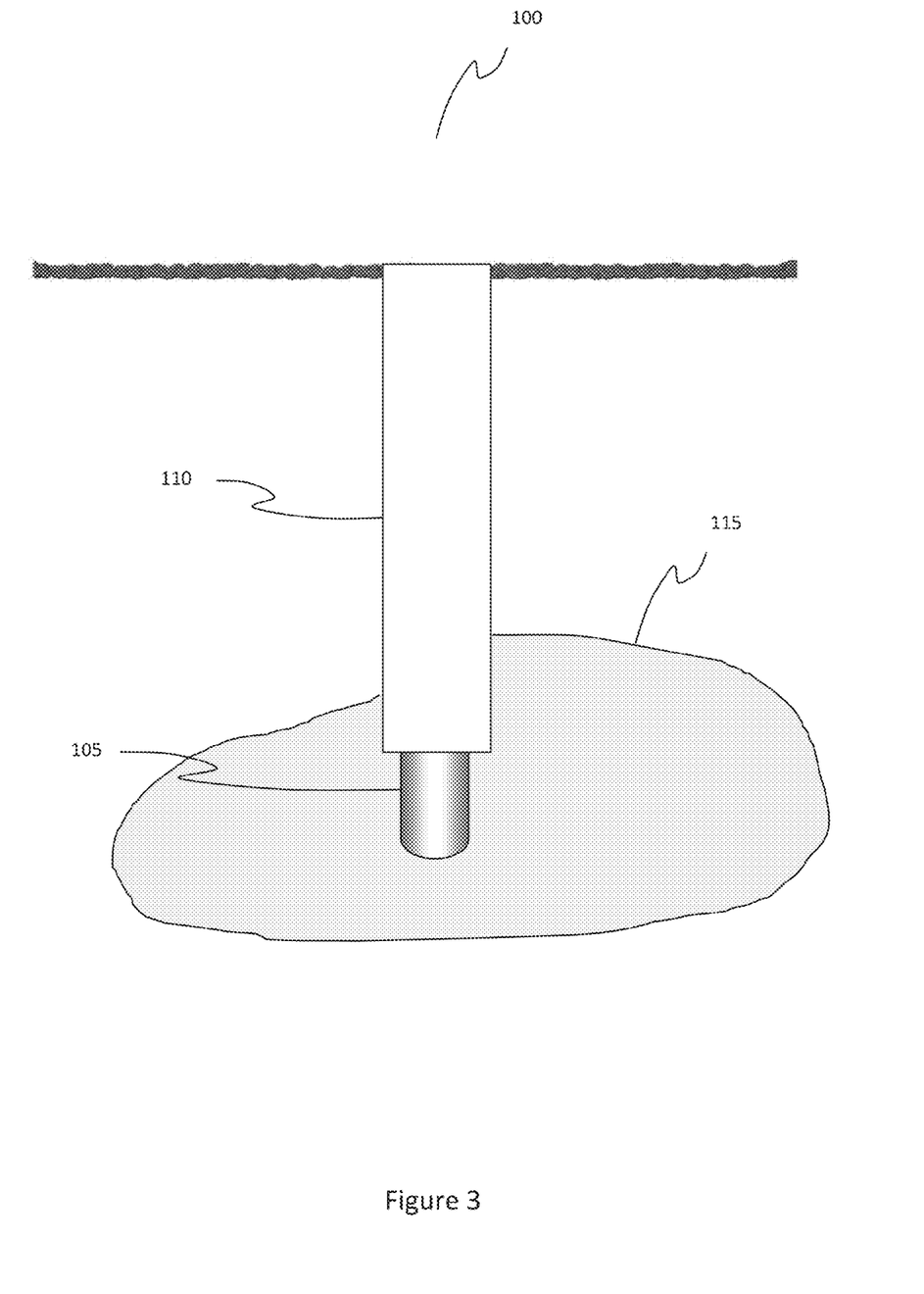
FIG. 3 is a schematic illustration showing some structural features of the EBR according to an aspect of the present invention

FIG. 3 is a schematic illustration showing some structural features of the EBR 100 according to an aspect of the present invention where the EBR reactor 105, is installed into a well 110 drilled in a polluted site such as groundwater 115.

Figure 4:
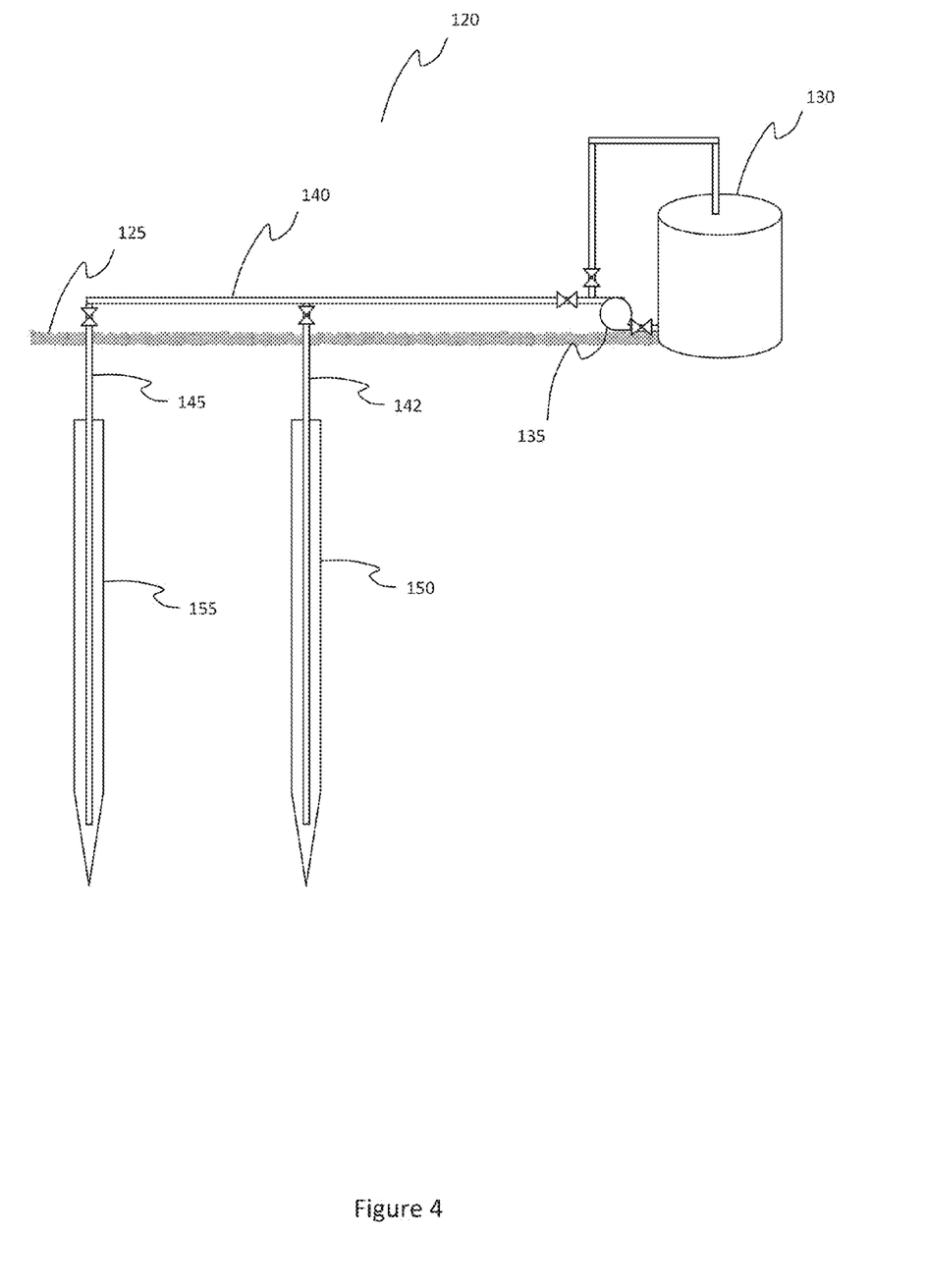
FIG. 4 is a schematic illustration showing some structural features of the EBR according to another aspect of the present in which the reactor is installed above ground and the reagents are pumped from the reactor to wells themselves located in a polluted site.

FIG. 4 is a schematic illustration showing some structural features of the EBR according to another aspect of the present invention 120, where the EBR reactor 130 is installed above ground 125 and where the reagents that are produced by the reactor are being delivered from the reactor by a pump 135 through pipes 140, 142 and 145 into wells 150 and 155. Measuring equipment can be installed into the reactor, in the wells or into a return pipe from the wells back to the reactor (not showed in the illustration).

The invention claimed is:

1. An electro bio remediation system (EBR), for polluted sites implementing chemical and biological breakdown modes on contaminating compounds, said system comprising:
    at least one reactor for in situ producing reagents required for said breakdown modes, said at least one reactor including at least three types of substantially independent electro-cells, wherein a first electro-cell type is utilized for producing hydrogen peroxide, a second electro-cell type is used for producing iron ions and a third electro-cell type is used for producing dissolved oxygen;
    at least one oxidation-reduction potential (ORP) measuring instrument; and
    a computerized controller which receives readings from said ORP measuring instrument, said controller regulating the ORP within a range supportive for microorganism activity by utilizing a mechanism which alters polarity between electrodes that are installed in said third electro-cell type during said biological breakdown mode, wherein said polarity altering mechanism alters said polarity whenever said ORP readings reach predefined values.

2. The EBR of claim 1 wherein said first electro-cell type comprises at least two diamond doped titanium coated electrodes, said second electro-cell type comprises at least two iron electrodes, and said third electro-cell type comprises at least two titanium coated $IrO_2$ and $Ta_2O_5$ electrodes.

3. The EBR of claim 1 further comprising sampling instruments for measuring temperature, pH and oxygen concentration.

4. The EBR of claim 3 further comprising instruments for the measurements of current density and conductivity.

5. The EBR of claim 1, wherein said controller alters said polarity for maintaining ORP below 450 my during said biological breakdown.

6. The controller of claim 1 wherein said controller alters said polarity for maintaining ORP between 150 my to 450 mv.

7. The EBR of claim 1, further including a mechanism which alters said polarity of said electrodes for cleaning sediments.

8. A method for remediation of a polluted site by implementing a combination of chemical and biological breakdown modes on the polluting compounds, by utilizing an electro bio remediation system (EBR), wherein said EBR comprises at least one reactor, wherein said at least one reactor includes at least three types of substantially independent electro-cells, wherein a first type of electro-cell is utilized for producing hydrogen peroxide, a second type of electro-cell is utilized for producing iron ions, and a third type of electro-cell is utilized for producing dissolved oxygen, said method comprising:

performing a survey of the chemical compounds and microorganism populations existing at said site to produce data;

loading said data to a computerized controller;

loading to said computerized controller also data obtained from measurements made by instruments installed in said EBR, said data include at least measurements of pH, oxidation-reduction potential (ORP) and temperatures;

setting target values for said measurements and data inputs governing the production by said EBR reactor, said target values include measured values and lab analysis data;

regulating the operation of said EBR by said computerized controller according to a stored programmed sequence, and said data input, measurements and target values;

producing Fenton reagents by said EBR reactor;

producing dissolved oxygen by said EBR reactor; and maintaining predefined range of ORP by altering polarity of electrodes which are installed in said third type of electro cells.

9. The method according to claim 8, wherein said altering polarity is for maintaining ORP between 150 my to 450 mv.

* * * * *